(12) United States Patent
Masucci

(10) Patent No.: US 6,990,123 B1
(45) Date of Patent: Jan. 24, 2006

(54) METHOD AND APPARATUS FOR REDUNDANT TRANSMISSION OVER TDMA OPTICAL NETWORKS

(75) Inventor: Jeffrey A. Masucci, Windham, NH (US)

(73) Assignee: Quantum Bridge Communications Inc., Horsham, PA (US)

( * ) Notice: Subject to any disclaimer, the term of this patent is extended or adjusted under 35 U.S.C. 154(b) by 0 days.

(21) Appl. No.: 09/490,189

(22) Filed: Jan. 24, 2000

(51) Int. Cl.
*H04J 3/06* (2006.01)
*H04L 12/28* (2006.01)
*H04L 7/02* (2006.01)
*H04L 25/40* (2006.01)
*H04B 10/00* (2006.01)

(52) U.S. Cl. .................. 370/519; 370/419; 370/907; 375/359; 375/358; 375/371; 398/154

(58) Field of Classification Search ............ 370/519, 370/419, 503, 517, 907; 375/354, 359, 358; 375/371; 398/154, 47, 71, 99, 100
See application file for complete search history.

(56) References Cited

U.S. PATENT DOCUMENTS

| | | | | |
|---|---|---|---|---|
| 4,577,312 A | * | 3/1986 | Nash | 370/249 |
| 5,173,899 A | | 12/1992 | Ballance | 370/108 |
| 5,327,277 A | | 7/1994 | Van Der Plas et al. | 359/140 |
| 5,398,129 A | | 3/1995 | Reimann | 359/137 |
| 5,479,451 A | | 12/1995 | Eldering et al. | 375/343 |
| 5,572,349 A | | 11/1996 | Hale et al. | 359/137 |
| 5,680,546 A | | 10/1997 | Chiaretti et al. | 395/200.01 |
| 5,754,535 A | | 5/1998 | Vandenabeele et al. | 370/321 |
| 5,774,244 A | | 6/1998 | Tandon et al. | 359/125 |
| 5,848,070 A | | 12/1998 | Durvaux et al. | 370/442 |
| 5,864,413 A | | 1/1999 | Feldman et al. | 359/125 |
| 5,864,414 A | | 1/1999 | Barnsley et al. | 359/125 |
| 5,872,645 A | | 2/1999 | Proctor | 359/136 |
| 5,896,213 A | | 4/1999 | Nagahori et al. | 359/137 |
| 5,896,474 A | | 4/1999 | Van Deventer et al. | 385/24 |
| 5,907,587 A | | 5/1999 | Sokoler | 375/368 |
| 5,926,478 A | | 7/1999 | Ghaibeh et al. | 370/395 |
| 5,930,018 A | | 7/1999 | Effenberger | 359/158 |
| 5,930,262 A | | 7/1999 | Sierens et al. | 370/422 |
| 6,122,335 A | | 9/2000 | Colella et al. | |
| 6,498,667 B1 | | 12/2002 | Masucci et al. | |
| 6,546,557 B1 | * | 4/2003 | Ovadia | 725/129 |
| 6,592,272 B1 | | 7/2003 | Masucci et al. | |
| 6,616,350 B1 | * | 9/2003 | de Boer et al. | 398/9 |
| 6,654,374 B1 | * | 11/2003 | Fawaz et al. | 370/394 |
| 2003/0219254 A1 | * | 11/2003 | Couch | 398/135 |

FOREIGN PATENT DOCUMENTS

EP    0 889 611 A1    1/1999

OTHER PUBLICATIONS

Denis J.G. Mestdagh; Fundamentals of Multiaccess Optical Fiber Networks; ISBN 0–89006; pp. 332–337; 1995.
ITU–T Recommendation G.983.1"Broadbend Optical Access System Based on Passive Optical Networks (PON)", Oct. 1998.

* cited by examiner

*Primary Examiner*—Chi Pham
*Assistant Examiner*—Ronald Abelson
(74) *Attorney, Agent, or Firm*—Robert P. Marley

(57) ABSTRACT

Communication between a burst manager and plural remote terminals over a first passive optical network (PON) and a second PON, with each PON having a downstream portion and an upstream portion, includes transmitting a common synchronization signal from the burst manager to the plural remote terminals over both downstream PON portions and transmitting burst data from the plural remote terminals over both upstream PON portions to the burst manager. The burst data for each remote terminal is delayed on the first and second PONs by corresponding first and second delays. The first delay includes a first ranging delay and the second delay includes a second ranging delay wherein the first and second ranging delays for each remote terminal are adjusted with respect to the common synchronization signal such that the burst data for any particular remote terminal transmitted on the first PON arrives at the burst manager simultaneously with the burst data for that particular remote terminal transmitted on the second PON in the same relative timeslot position.

10 Claims, 8 Drawing Sheets

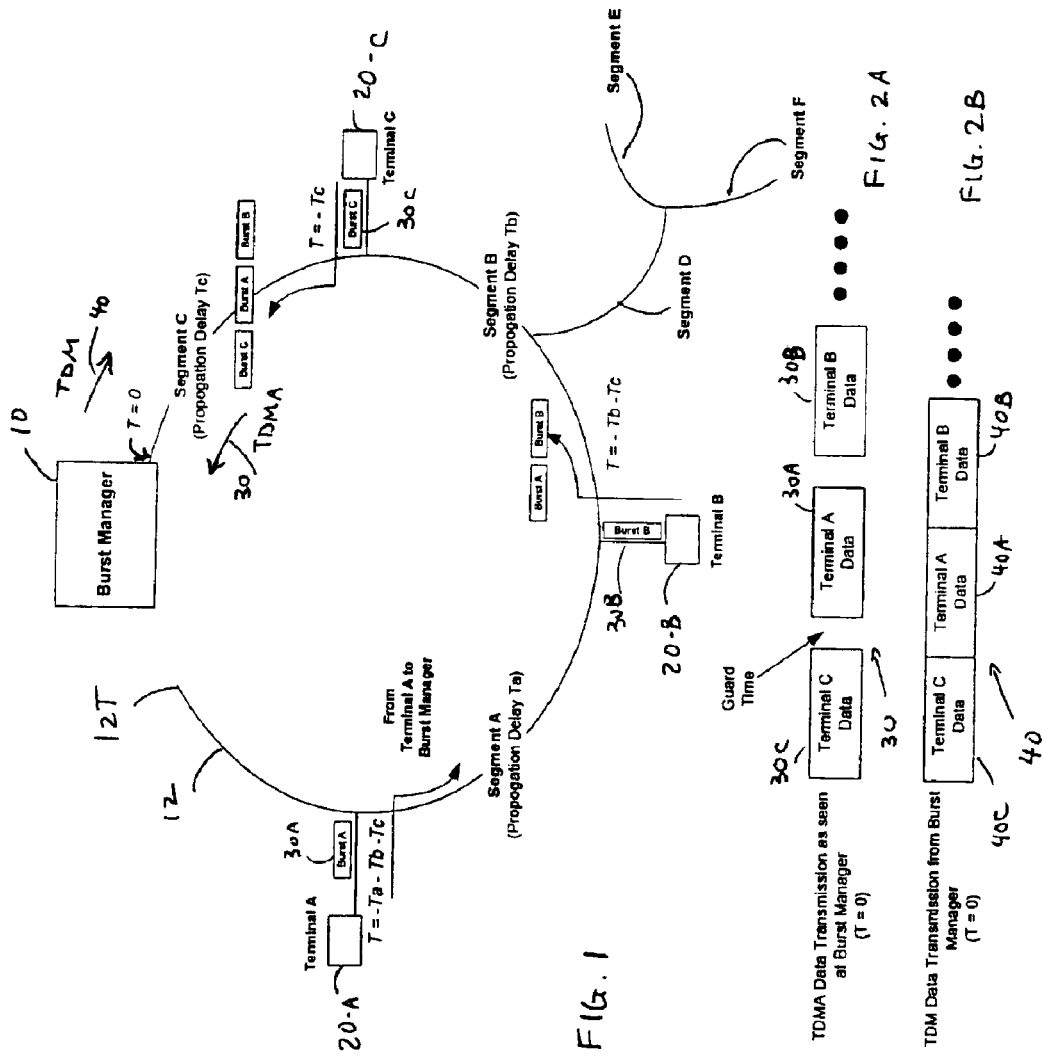

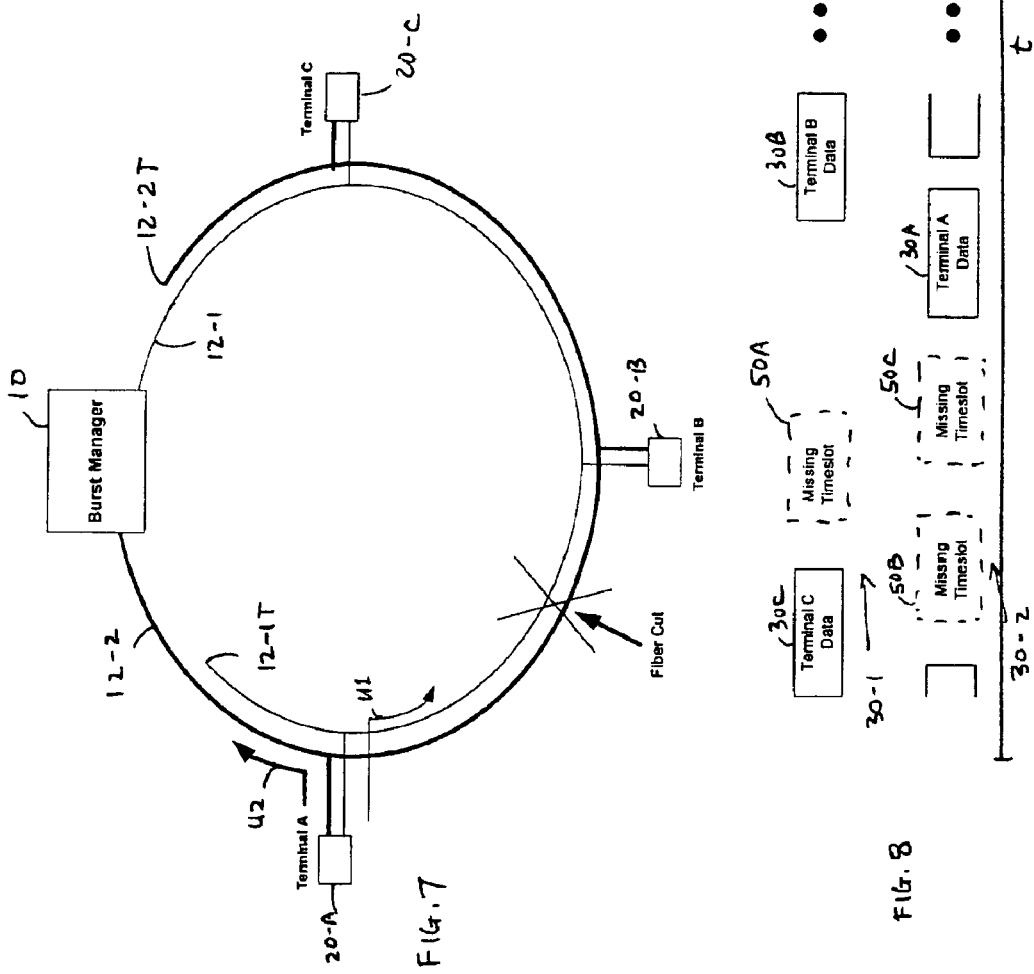

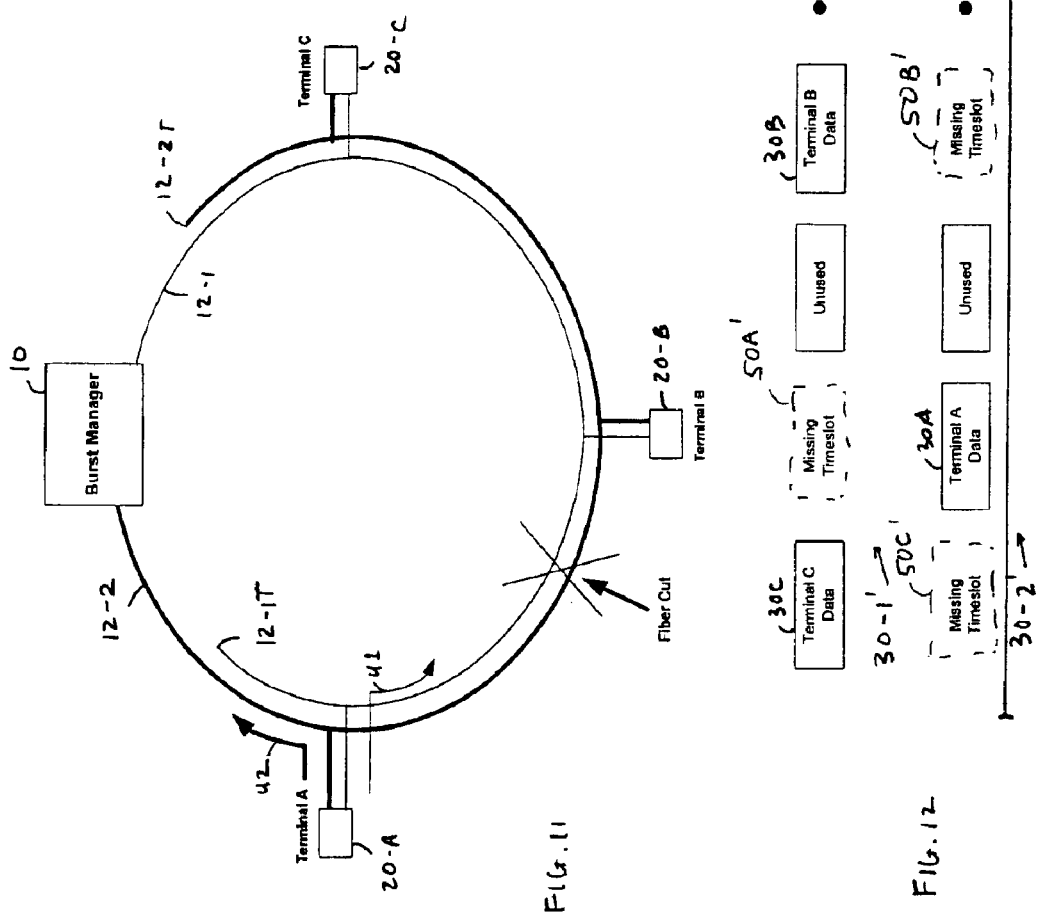

US 6,990,123 B1

METHOD AND APPARATUS FOR REDUNDANT TRANSMISSION OVER TDMA OPTICAL NETWORKS

BACKGROUND OF THE INVENTION

In a time division multiple access (TDMA) optical system which comprises multiple optical devices transmitting toward a single optical receiver, each optical device transmits by bursting its information onto the common physical medium. Transmissions from different sources are made possible by offsetting, in time, the burst from each device so that none of the bursts overlaps, in time, with any other burst from any source. Otherwise, the transmissions from two or more devices could collide at some common point in the network, causing loss of data. The time allocated for a single burst of data from a given transmitter is referred to as a "timeslot".

In the current network environment, telecommunications service providers typically deploy services using SONET/SDH add/drop multiplexers. To provide redundancy protection, the SONET/SDH elements are arranged in ring configurations which provide line or path protection switching. In such protection switching schemes, the data that is transmitted on a working path is independent and unsynchronized with respect to data that is transmitted on a protection path. Generally, in order to not incur data loss in a failure situation, this requires that multiple timeslots or frames from each path or line be stored in a buffer prior to performing an analysis of which data is valid and which is corrupted. Such buffering adds undesirable complexity and latency to the system. Most often, communication systems incur data loss for some period of time, e.g., 50 ms in a SONET network, prior to recovering full error-free transmission.

SUMMARY OF THE INVENTION

It would be advantageous to provide protection in an optical network with minimal data loss and without requiring extensive data buffering.

The approach of the present method and apparatus provides efficient and fast recovery on a timeslot basis of redundant data transmitted from remote terminals to a burst manager in a passive optical network or other network using TDMA. This approach can be used in a full or half-duplex mode and with multiple wavelengths.

Accordingly, a method of communicating between a burst manager and plural remote terminals over a first passive optical network (PON) and a second PON, with each PON having a downstream portion and an upstream portion, includes transmitting a common synchronization signal from the burst manager to the plural remote terminals over both downstream PON portions and transmitting burst data from the plural remote terminals over both upstream PON portions to the burst manager. The burst data for each remote terminal is delayed on the first and second PONs by corresponding first and second delays. The first delay includes a first ranging delay and the second delay includes a second ranging delay wherein the first and second ranging delays for each remote terminal are adjusted with respect to the common synchronization signal such that the burst data for any particular remote terminal transmitted on the first PON arrives at the burst manager simultaneously with the burst data for that particular remote terminal transmitted on the second PON.

According to an aspect of the method, burst data is transmitted in TDMA timeslots such that corresponding timeslots on both PONs for each remote terminal are received at the burst manager aligned and in the same relative timeslot position. Data received in the corresponding timeslots on both PONs at the burst manager is examined to determine which timeslots contain valid data and the valid data is selected on a per timeslot basis.

A communication system in accordance with the invention includes first and second PONs each having a downstream portion and an upstream portion. A burst manager coupled to the first and second PONs transmits a common synchronization signal over both downstream PON portions. Plural remote terminals coupled to the first and second PONs each transmit burst data over both upstream PON portions to the burst manager, the burst data for each remote terminal being delayed on the first and second PONs by corresponding first and second delays. The first delay comprises a first ranging delay and the second delay comprises a second ranging delay wherein the first and second ranging delays for each remote terminal are adjusted with respect to the common synchronization signal such that the burst data for any particular remote terminal transmitted on the first PON arrives at the burst manager simultaneously with the burst data for that particular remote terminal transmitted on the second PON.

While the principles of the invention are described herein with reference to passive optical networks, it should be understood that the present synchronization mechanism can be applied in other TDMA network environments, including wireless networks.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 is a block diagram illustrating a single TDMA passive optical network configuration.

FIGS. 2A and 2B are timing diagrams showing respective data transmissions to and from the burst manager in the configuration of FIG. 1.

FIG. 7 is a block diagram illustrating a fiber cut in the counter-rotating redundant passive optical network configuration of FIG. 3.

FIG. 8 is a timing diagram showing data transmissions to the burst manager on the redundant network configuration of FIG. 7.

FIG. 11 is a block diagram illustrating a fiber cut in the synchronized redundant network configuration of FIG. 9.

FIG. 12 is a timing diagram showing data transmissions to the burst manager on the redundant network configuration of FIG. 11.

DETAILED DESCRIPTION OF THE INVENTION

Figure 3:
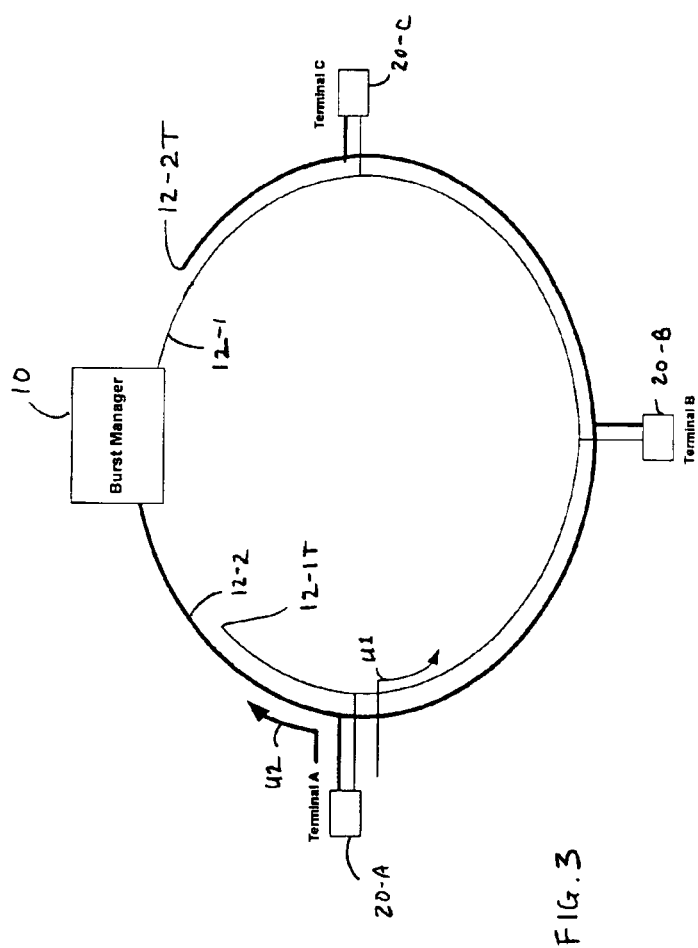
FIG. 3 is a block diagram illustrating a counter-rotating redundant passive optical network configuration using independent network timing.

Transmission from multiple devices, wherein each device is located at a different physical distance (in a range from a few feet to many miles apart), can be provided using TDMA. A TDMA access technique requires that each device that transmits does so by bursting its information onto a common physical medium at a specifically assigned time. Transmitted signals from different physical devices are received without collision by a central terminal, also referred to as a burst manager, by allocating specific non-overlapping timeslots to each device and by offsetting the bursts, in time, to account for the difference in propagation delay between devices. Otherwise, the transmissions from two devices could collide at some common point in the network, causing loss of data.

FIG. 1 shows a single network which illustrates transmission in a typical passive optical network (PON). For simplicity, three remote terminals 20-A, 20-B, 20-C are shown in the network connected to a burst manager 10 over a PON 12. The network 12 includes downstream and upstream portions and is logically configured as a quasi-ring which terminates at point 12T. The remote terminals 20-A, 20-B, 20-C transmit respective burst data 30A, 30B, 30C upstream to a burst manager 10 using TDMA. The burst data from the remote terminals is received at the burst manager as TDMA signal 30 (FIG. 2A).

Each remote terminal receives from the burst manager a time division multiplexed (TDM) signal 40 (FIG. 2B) which traverses the downstream path from the burst manager to the network termination 12T. The TDM signal includes data in successive timeslots 40A, 40B, 40C. The remote terminals receive the same TDM signal but at different times due to the propagation delay of the media used to carry the signal. For example, Terminal A 20-A receives the TDM signal at a time T=Ta+Th+Tc where Ta, Th and Tc are the respective propagation delays associated with network segments A, B and C.

When a particular remote terminal 20-A, 20-B, 20-C transmits data to the burst manager, it does so using TDMA. Use of TDMA allows terminal A, for example, to transmit its signal to the burst manager 10 without colliding with a signal from another terminal. The burst manager synchronizes the remote terminals using a ranging process. The ranging process essentially negates the effect of transmission delay and allows the remote terminals to appear directly connected to some reference point inside the burst manager. This reference point is shown at the input to the burst manager in FIG. 1 at a time T=0.

The ranging process is keyed to a synchronization signal carried in the TDM signal sent from the burst manager 10. In a system in which the downstream TDM signal is formatted as 125 µs frames, for example, the synchronization signal comprises an 8 kHz frame sync signal. The range offset for a particular remote terminal is referenced to this synchronization signal. Since all remote terminals receive the same synchronization signal, the terminals are referenced to each other, but at different times due to their respective propagation delays. Once an offset has been provided by the burst manager to each remote terminal, through the ranging process, the remote terminals are synchronized to the network and can transmit at an appropriate time without colliding with a signal sent from another terminal.

The actual burst data appears on the network 12 as shown in FIG. 1 and FIG. 2A. A guard band is provided between bursts to accommodate any variation in the synchronization or clock timing between devices on the network.

In the example network of FIG. 1, remote terminals A, B and C are configured to transmit data to the burst manager at defined times. These times are defined by the ranging procedure which informs remote terminal A 20-A that its time delay is Ta+Tb+Tc in the downstream direction from the burst manager 10 to remote terminal A and Ta+Th+Tc in the upstream direction from remote terminal A to the burst manager. Therefore, the total delay that must be accounted for is approximately twice the one way signal delay from a remote terminal to the burst manager. A data processing delay must also be accounted for but has not been shown.

Once ranged, remote terminal A transmits its burst data 30A at time T=−Ta−Th−Tc. This signal 30A arrives at remote terminal B at time T=−Tb−Tc at which time remote terminal B inserts its signal 30B onto the network 12. The difference in time between when remote terminals A and B transmit is equal to the propagation delay of network segment A and the position of the signals relative to each other in the frame structure, i.e., a timeslot offset amount. In this example, the signal 30A from remote terminal A happens to appear before the corresponding signal 30B from remote terminal B, but it could have been reversed, depending upon timeslot assignments made by the burst manager.

The burst signal arrives at remote terminal C at time T=−Tc at which time remote terminal C inserts its signal 30C onto the network 12. In this example, remote terminal C inserts its signal 30C just prior to, but not overlapping with, the signal 30A from remote terminal A. Again, the relative positioning of the signals 30A, 30B and 30C can differ depending upon timeslot assignments from the burst manager.

The basic configuration can be extended to include more serial network segments similar to network segments A, B and C and branching segments shown as segments D, E and F in FIG. 1.

Figures 5, 6:
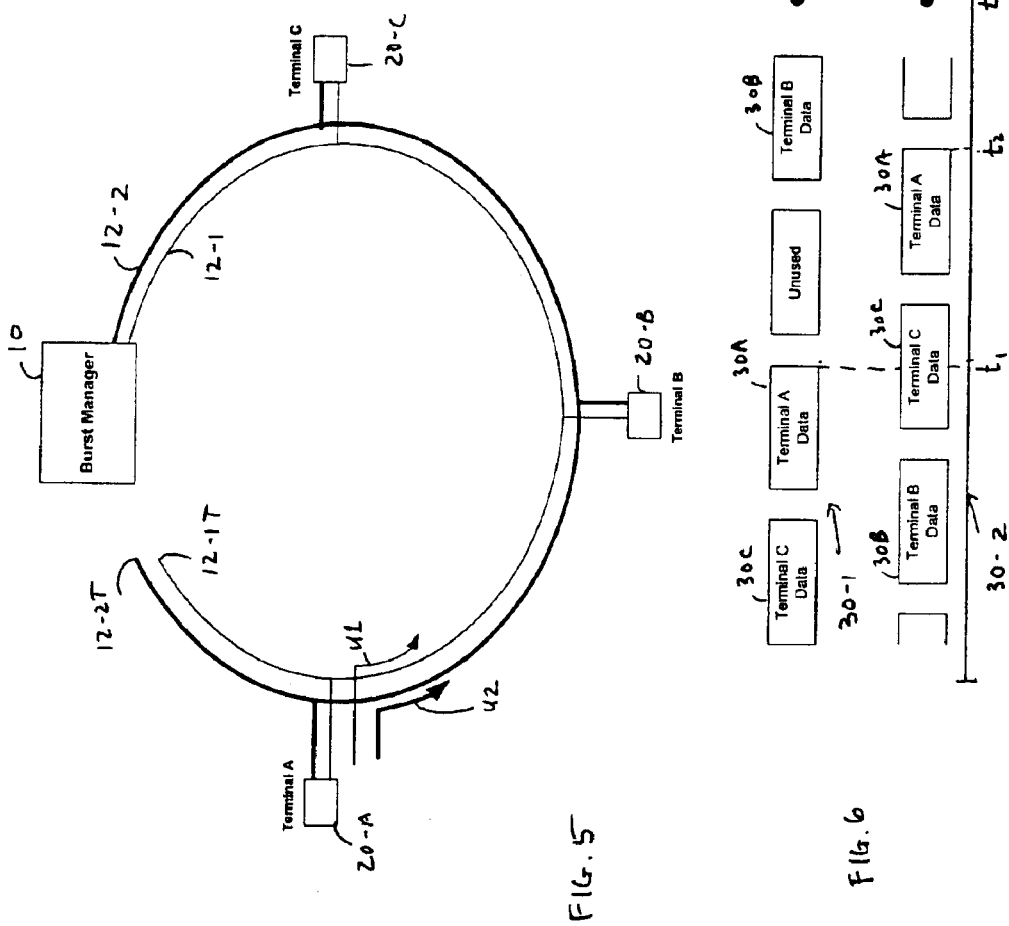
FIG. 5 is a block diagram illustrating a unidirectional redundant passive optical network configuration using independent network timing.
FIG. 6 is a timing diagram showing data transmissions to the burst manager on the redundant network configuration of FIG. 5.

A redundant network configuration is shown in FIG. 3. In this configuration, a pair of passive optical networks 12-1, 12-2 are used to connect the remote terminals 20A, 20-B, 20-C with the burst manager 10. The networks 12-1, 12-2 are configured as counter-rotating quasi-rings which terminate at respective points 12-1T, 12-2T. In this arrangement, the remote terminals 20-A, 20-B, 20-C and the burst manager 10 are each connected to both networks 12-1, 12-2. TDMA transmission is used independently on the networks 12-1, 12-2. Redundant data is transmitted in opposite directions in the counter-rotating configuration as indicated by the upstream transmission arrows designated U1, U2 in FIG. 3. In a uni-directional quasi-ring configuration shown in FIG. 5, redundant data is transmitted in the same direction as indicated by the upstream transmission arrows U1, U2. The networks in FIGS. 3 and 5 are physically separated by the use of different optical fibers. Such networks can operate with the same or different optical wavelengths. It should also be understood that other redundant networks can be configured by using, for example, different optical wavelengths for each network on a single optical fiber, two different wavelengths for the different directions of transmission or any other logical combination.

Figure 4:
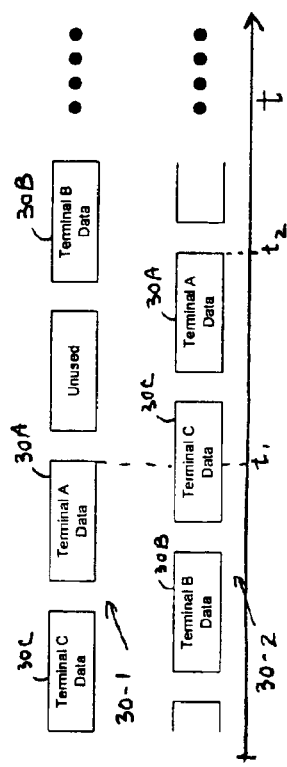
FIG. 4 is a timing diagram showing data transmissions to the burst manager on the redundant network configuration of FIG. 3.

With both networks operated independently as shown in FIGS. 3 and 5, the redundant data transmitted by a particular remote terminal attached to both networks does not arrive at the burst manager at the same time. This independent timing can be understood with reference to the upstream signals 30-1, 30-2 transmitted on networks 12-1, 12-2, respectively, as shown in FIGS. 4 and 6. For example, burst data transmitted by remote terminal A arrives at the burst manager at time $t=t_1$ on network 12-1 while the same redundant data transmitted from remote terminal A on network 12-2 arrives at a different time, $t=t_2$. Likewise, because of the independent timing, the redundant burst transmissions 30B, 30C from respective remote terminals B and C arrive at the burst manager on the separate networks 12-1, 12-2 at independent times. In normal operation, the burst manager designates one of the networks 12-1, 12-2 as the active network and the other as the protection network.

In a failure condition in the counter-rotating network configuration, such as the fiber cut shown in the network segments between remote terminals A and B in FIG. 7, some of the redundant burst data is blocked from being received at the burst manager 10. The streams 30-1, 30-2 of burst data received at the burst manager on respective networks 12-1, 12-2 are shown in FIG. 8. It is noted that stream 30-1 from network 12I includes burst data 30B and 30C from remote terminals B and C, respectively, with data missing from remote terminal A in timeslot 50A. Likewise, stream 30-2 from network 12-2 includes burst data 30A from remote terminal A with data missing from remote terminals B and C in timeslots 50B, 50C, respectively. Thus, for example, burst data 30A transmitted from remote terminal A on network 12-1 is blocked from being received at the burst manager 10 while the redundant burst data transmitted from remote terminal A on network 12-2 is received intact at the burst manager.

Since the burst data does not arrive at the same point in time at the burst manager 10 as noted earlier, buffering is required at the burst manager to align the data before a decision can be made regarding which stream to select as valid. Clearly, buffering adds complexity and delay to the burst manager. In addition, the time required for the burst manager to make a decision as to which data sample to use from the redundant networks adds more delay and complexity to the decision algorithm.

The principles of the present invention are now described with reference with to the network configuration shown in FIG. 9. The network configuration is similar to the counter-rotating rings shown in FIG. 3. Note that the principles of the invention also apply to other network configurations, including unidirectional rings similar to that shown in FIG. 5. A key aspect of the present approach is that the burst manager 10 is configured to synchronize burst data from a particular remote terminal on network 12-1 to the same data transmitted on the redundant network 12-2. Synchronization is maintained for all remote terminals so that the burst data for any particular remote terminal transmitted on one network arrives at the burst manager simultaneously with the burst data transmitted on the other network.

Figure 9:
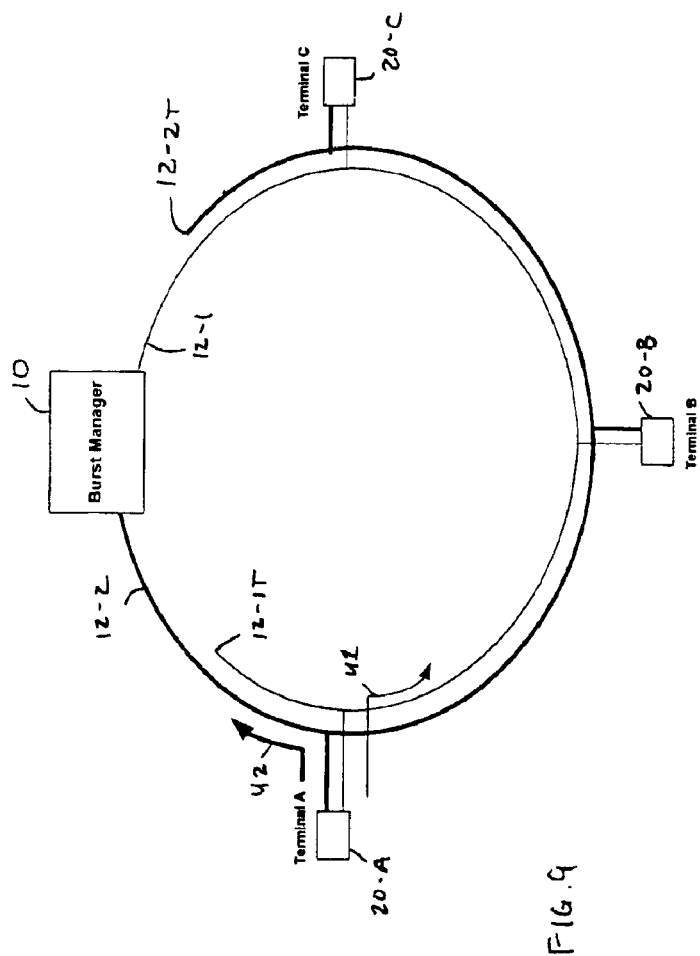
FIG. 9 is a block diagram illustrating a counter-rotating redundant passive optical network configuration using the synchronized network timing of the present invention.
Figure 10:
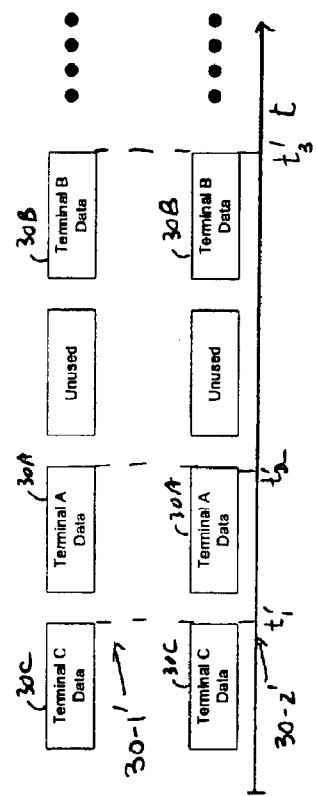
FIG. 10 is a timing diagram showing data transmissions to the burst manager on the synchronized redundant network configuration of FIG. 9.

With synchronized operation of the redundant networks, as shown in FIG. 9, the redundant data transmitted by a particular remote terminal attached to both networks arrives at the burst manager at the same time. Any particular remote terminal is assigned timeslots in the same relative timeslot positions on both networks so that the redundant data arrives at the burst manager in timeslots that are aligned. The synchronized timing can be understood with reference to the upstream signals 30-1', 302' transmitted on networks 12-1, 12-2, respectively, as shown in FIG. 10. For example, burst data 30C transmitted from remote terminal C on network 12-1 arrives at the burst manager at the same time $t=t_1'$ as the redundant burst data transmitted on network 122. Likewise, because of the synchronized timing and explicit timeslot configuration, the redundant burst transmissions 30A, 30B from respective remote terminals A and B arrive at the burst manager on the separate networks 12-1, 12-2 at respective times $t=t_2'$ and $t=t_3'$.

In case of a network failure, as shown in FIG. 11, the burst manager 10 can quickly select data transmitted by a remote terminal from either network 12-1 or from network 12-2. The synchronized streams 30-1', 30-2' of burst data received at the burst manager on respective networks 12-1, 12-2 are shown in FIG. 12. It is noted that stream 30-1' from network 12-1 includes burst data 30B and 30C from remote terminals B and C, respectively, with data missing from remote terminal A in timeslot 50A'. Likewise, stream 30-2' from network 12-2 includes burst data 30A from remote terminal A with data missing from remote terminals B and C in timeslots 50B', 50C', respectively. Because the streams are synchronized, no selection delay is incurred. Note that the network failure in FIG. 11 affects both networks 12-1, 12-2. It should be noted that the burst manager treats a failure affecting only a single network 12-1 or 12-2 in a similar manner so as to select the stream having valid data.

There are several advantages provided by the synchronization approach of the present invention. With the synchronization approach, limited or no data buffering is required at the burst manager to select valid data from the redundant networks in the event of data corruption or other failure scenario. A TDMA system that does not synchronize its redundant networks typically requires an entire set of timeslots from each network be stored in a buffer prior to performing an analysis of which data is valid and which is corrupted. In a synchronized network, as described in this invention, a minimum of zero and a maximum of a single timeslot need be stored to discern which data from the networks is valid or corrupted.

Another advantage is that selection between redundant data where one data packet (or timeslot) is always valid can result in no packet/cell loss on a per timeslot basis rather than a frame basis as in other types of networks. In prior redundant networks, corrupted frames of data are normally discarded rather than having large amounts of buffering to store and retrieve valid data from corrupted data. In the present invention, a single timeslot carrying data packets or cells on one network is compared to the timeslot on the redundant network to determine which is valid. A selection is immediately made resulting in no data loss assuming that one of the networks is operational as should be the case in redundant networks.

Another advantage is that latency of protection switching is reduced on a failure condition in the redundant network since a pattern immediately appears that indicates which timeslots should be used from each network. This pattern is described further below with reference to FIG. 14. This can result in sub-millisecond protection switching times. When a failure condition, such as a fiber cut, occurs on a redundant network, the burst manager must determine which network is operational. Systems normally require several data frames, with many cells and/or packets within them, to determine which network to chose data from. In this invention packet and cell timeslots are used to discern the nature of the failure. A protection switch on a per timeslot basis can be made in under a millisecond versus several or tens of milliseconds for other systems.

Yet another advantage is the ease of system configuration afforded by the present synchronization approach. Services on the synchronized redundant networks described herein can be established by configuring timeslots in the same location in the data path of both TDMA networks. Confusion can arise in other systems in which the services on one network are placed in a different timeslot that the other network. With the present invention the timeslots, and therefore the services, on the redundant networks can be compared directly to infer whether they have been established correctly.

Figure 13:
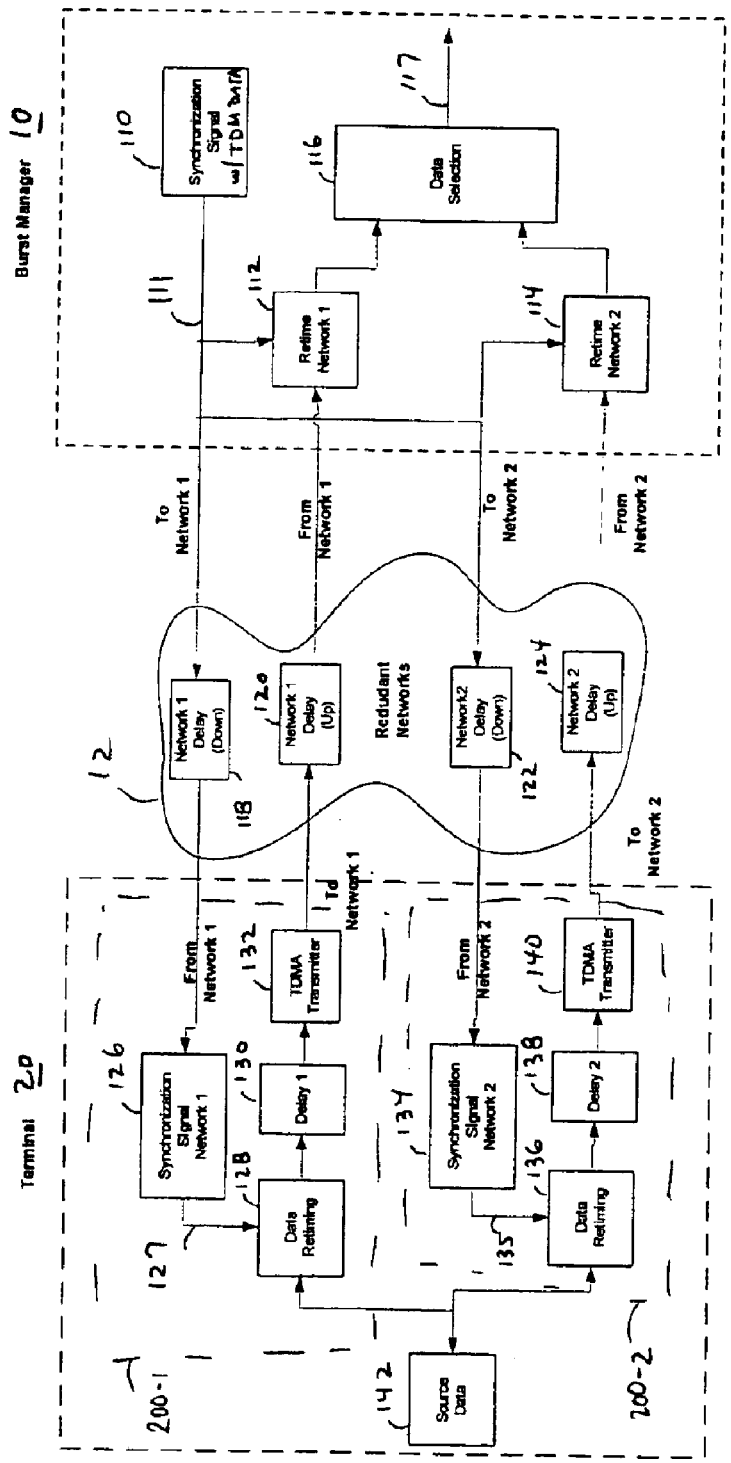
FIG. 13 is a block diagram of an embodiment of the synchronized redundant network configuration of FIG. 9.

Referring now to FIG. 13, a block diagram of a system embodiment includes burst manager 10, networks 12 and a single remote terminal 20 shown for simplicity. The burst manager 10 includes a synchronization signal block 110, network retiming blocks 112, 114 and a data selection block 116. Other functions which the burst manager 10 may include which do not relate to the principles of the present invention, such as switching and network interfaces, are not shown.

The two networks when separated operate as typical TDMA networks. A TDM synchronization signal, including data, is sent downstream to all listening remote terminals. Data, clock, and a synchronization signal are recovered by the remote terminals. Data sourced by a remote terminal is retimed to the recovered clock and delayed by an amount equal to a ranging delay. The data is then burst upstream and recovered by the burst manager where it is retimed to the system clock.

The difference between the invention presented herein and two independently operated TDMA networks is that a common synchronization signal is sent to both networks and the ranging delays are adjusted to force the redundant data to appear at the burst manager at the same time for both networks. The synchronization signal sent from the burst manager provides the remote terminal with the same reference clock and synchronization signal on both network inputs. When data is sourced by the remote terminal, it is retimed to a clock that is derived from the burst manager synchronization signal carried via the redundant networks.

In general embodiments of the burst manager 10 derive system transmission timing either from a network source, such as SONET transmission signal delivered to a network interface (not shown), or from a local stratum clock. The derived synchronization signal, e.g., an, 8 kHz frame synch signal, is provided by signal block 110 along with a TDM data signal.

The networks 12 are shown with the propagation delay components in the two networks: network 1 downstream delay 118, network 1 upstream delay 120, network 2 downstream delay 122 and network 2 upstream delay 124.

The remote terminal 20 includes a first and second network sections 200-1, 2002, respectively, and a source data block 142. The first network section 200-1 includes synchronization signal block 126, data retiming block 128, delay 130, and TDMA transmitter 132. Likewise, second network section 200-2 includes synchronization signal block 134, data retiming block 136, delay 138, and TDMA transmitter 140.

In particular, the operation can be understood as follows with respect to network section 200-1. A synchronization signal 111 at the burst manager 10 is distributed and transmitted onto each network 12 separately. The synchronization signal is recovered by the remote terminal from the network at block 126. The recovered synchronization signal 127 is used to derive timing in retiming block 128 for data transmission in the return path to the burst manager. Data sourced by the remote terminal in source data block 142 is delayed in delay block 130 by a time equal but opposite to the delay introduced by the network and data processing components in both directions of transmission, effectively negating its effect (nominal ranging delay). The TDMA transmitter 132 injects the data into the network towards the burst manager 10. Likewise, the same operation occurs in network section 200-2 with the exception of the delay block 138. Since the propagation delay in the other network is different, a different delay value is used to negate the effects of the propagation delay in delay block 138. In addition, the delay values in respective delay blocks 130, 138 are adjusted in the remote terminal with respect to the synchronization signal to allow data injected on each network to appear at the burst manager at the same time.

At the burst manager 10, the data is recovered from both networks using retiming blocks 112, 114 and is coupled to the data selection block 116 where a selection is made from the two recovered data streams to provide an output stream 117. Corrupted timeslots are discarded in favor of valid data carrying timeslots.

It will be understood that the data delay values set in delay blocks 130, 138 in a counter rotating redundant network will be different due to the differing propagation delays. In a uni-directional redundant network the propagation delays may or may not be the same. If the delays for each network are equivalent then the delays must be adjusted only with corresponding timeslot offsets to position the data with respect to the synchronization signal.

Figure 14:
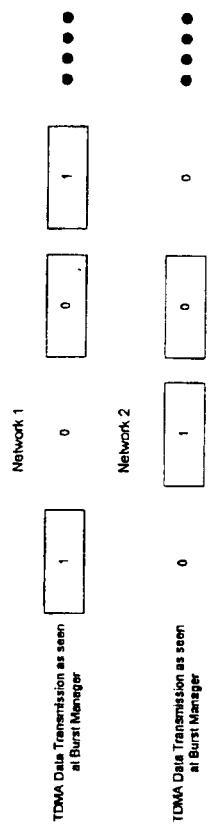
FIG. 14 is a diagram of a logic view of the data transmissions received at the burst manager of FIG. 13.

The appearance and loss of data (timeslots) that appears on the redundant networks from a network failure as shown in FIG. 11 can be logically represented as a set of logic '1's for the acquisition of valid data and logic '0's for corrupted or lost data. The resulting pattern, shown in FIG. 14, provides a direct and simplistic view to the burst manager of which timeslots and carried data to select from the redundant networks. The data selection can be performed on a per timeslot basis with little or no data loss rather than on a per frame basis such as in SONET based systems where several frames of data can be lost before recovery is made.

Figure 15:
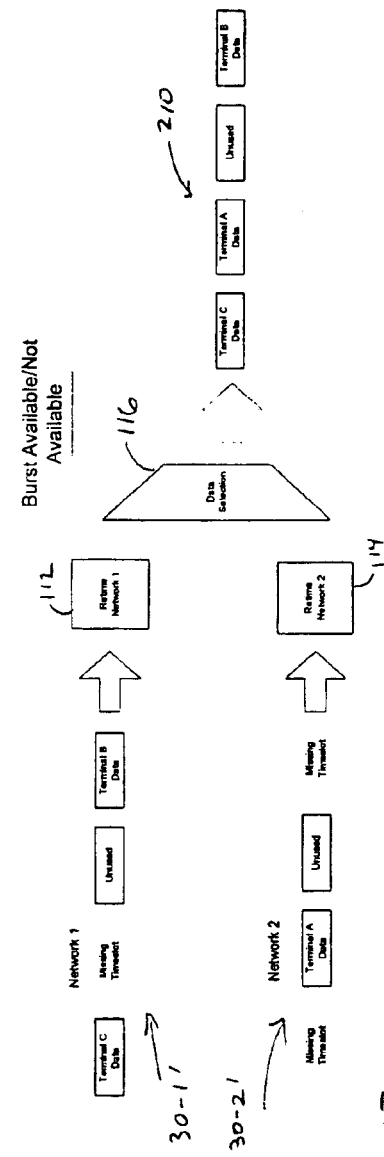
FIG. 15 is a block diagram showing data selection operation of the data selection block of FIG. 13.

Operation of the data selection block 116 and network retiming 112, 114 at the burst manager is shown in FIG. 15. Timeslots 30-1', 30-2' from network 1 and network 2 are recovered at the burst manager and presented to the data selection block 116. Data is synchronized such that data from a specific remote terminal appears on both networks at the same time. The selector 116 can quickly decide which data is valid and which data is corrupted. It will only pass valid data, discarding the corrupted data to provide the output stream 210. The protection switching process is much quicker than other methods and requires little or no buffering at the retiming stage. In addition, no data needs to be lost since the selection is made on a per timeslot basis rather than a per frame basis.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of communicating between a burst manager and plural remote terminals over a first passive optical network (PON) and a second PON, each PON having a downstream portion and an upstream portion, the method comprising:
  transmitting a common synchronization signal from the burst manager to the plural remote terminals over both downstream PON portions;
transmitting burst data from the plural remote terminals over both upstream PON portions to the burst manager, the burst data for each remote terminal being delayed on
  the first PON by a corresponding first delay and being delayed on the second PON by a corresponding second delay, the first delay comprising a first ranging delay and the second delay comprising a second ranging delay wherein the first and second ranging delays for each remote terminal are adjusted with respect to the common synchronization signal such that the burst data for any particular remote terminal transmitted on the first PON arrives at the burst manager simultaneously with the burst data for that particular remote terminal transmitted on the second PON, wherein transmitting burst data includes transmitting burst data in TDMA timeslots such that corresponding timeslots on both PONs for each remote terminal are received at the burst manager aligned and in the same relative timeslot position and further comprising examining data received in the corresponding timeslots on both PONs at the burst manager to determine which timeslots contain valid data selecting a valid data on a per timeslot basis.

2. The method of claim 1 wherein the first and second PONs are configured as counter-rotating quasi-rings.

3. The method of claim 1 wherein transmitting the common synchronization signal from the burst manager includes transmitting the common synchronization signal in a downstream TDM signal over both downstream PON portions.

4. A method of communicating between a burst manager and plural remote terminals over a first passive optical network (PON) and a second PON, each PON having a downstream portion and an upstream portion, the method comprising:
transmitting a common synchronization signal from the burst manager to the plural remote terminals over both downstream PON portions;

transmitting burst data from the plural remote terminals over both upstream PON portions to the burst manager, the burst data for each remote terminal being delayed on the first PON by a corresponding first delay and being delayed on the second PON by a corresponding second delay, the first delay comprising a first ranging delay and the second delay comprising a second ranging delay wherein the first and second ranging delays for each remote terminal are adjusted with respect to the common synchronization signal such that the burst data for any particular remote terminal transmitted on the first PON arrives at the burst manager simultaneously with the burst data for that particular remote terminal transmitted on the second PON wherein the first and second PONs are configured as uni-directional quasi-rings.

5. The method of claim 4, wherein transmitting the common synchronization signal from the burst manager includes transmitting the common synchronization signal in a downstream TDM signal over both downstream PON portions.

6. A communication system comprising:
a first passive optical network (PON) having a downstream portion and an upstream portion;

a second passive optical network (PON) having a downstream portion and an upstream portion;

a burst manager coupled to the first and second PONs, the burst manager transmitting a common synchronization signal over both downstream PON portions; and a plurality of remote terminals coupled to the first and second PONs for communicating with the burst manager, each remote terminal transmitting burst data over both upstream PON portions to the burst manager, the burst data for each remote terminal being delayed on the first PON by a corresponding first delay and being delayed on the second PON by a corresponding second delay, the first delay comprising a first ranging delay and the second delay comprising a second ranging delay wherein the first and second ranging delays for each remote terminal are adjusted with respect to the common synchronization signal, such that the burst data for any particular remote terminal transmitted on the first PON arrives at the burst manager simultaneously with the burst data for that particular remote terminal transmitted on the second PON wherein the remote terminals transmit burst data in the TDMA timeslots and the first and second ranging delays include a corresponding timeslot offset such that corresponding timeslots on both PONs for each remote terminal are received at the burst manager aligned and in the same relative timeslot position and wherein the burst manager examines data received in the corresponding timeslots on both PONs to determine which timeslots contain valid data and selects valid data on a per timeslot basis.

7. The system of claim 6 wherein the first and second PONs are configured as counter-rotating quasi-rings.

8. The system of claim 6 wherein the burst manager transmits the common synchronization signal in a downstream TDM signal over both downstream PON portions.

9. A communication comprising:
a first passive optical network (PON) having a downstream portion and an upstream portion;

a second passive optical network (PON) having a downstream portion and an upstream portion;

a burst manager coupled to the first and second PONs, the burst manager transmitting a common synchronization signal over both downstream PON portions; and a plurality of remote terminals coupled to the first and second PONs for communicating with the burst manager, each remote terminal transmitting burst data over both upstream PON portions to the burst manager, the burst data for each remote terminal being delayed on the first PON by a corresponding first delay and being delayed on the second PON by a corresponding second delay, the first delay comprising a first ranging delay and the second delay comprising a second ranging delay wherein the first and second ranging delays for each remote terminal are adjusted with respect to the common synchronization signal such that the burst data for any particular remote terminal transmitted on the first PON arrives at the burst manager simultaneously with the burst data for the particular remote terminal transmitted on the second PON, wherein the first and second PONs are configured as uni-directional quasi-rings.

10. The system of claim 9 wherein the burst manager transmits the common synchronization signal in a downstream TDM signal over both downstream PON portions.

* * * * *